(12) United States Patent
Noël

(10) Patent No.: US 11,887,632 B1
(45) Date of Patent: Jan. 30, 2024

(54) SYSTEMS AND METHODS FOR CONFIRMING ACCURACY OF VIDEO EDITS

(71) Applicant: GoPro, Inc., San Mateo, CA (US)

(72) Inventor: Jean-Baptiste Noël, Le Vesinet (FR)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 17/848,034

(22) Filed: Jun. 23, 2022

Related U.S. Application Data

(60) Provisional application No. 63/214,707, filed on Jun. 24, 2021.

(51) Int. Cl.
| | | |
|---|---|---|
| *G11B 27/34* | (2006.01) | |
| *G11B 27/00* | (2006.01) | |
| *G11B 27/031* | (2006.01) | |
| *G11B 27/36* | (2006.01) | |
| *G06K 19/06* | (2006.01) | |

(52) U.S. Cl.
CPC ........ *G11B 27/36* (2013.01); *G06K 19/06028* (2013.01); *G06K 19/06037* (2013.01); *G11B 27/005* (2013.01); *G11B 27/031* (2013.01); *G11B 27/34* (2013.01)

(58) Field of Classification Search
CPC ..... G11B 27/36; G11B 27/005; G11B 27/031; G11B 27/34; G06K 19/06028; G06K 19/06037
USPC .................................................. 386/263, 282
See application file for complete search history.

(56) References Cited

U.S. PATENT DOCUMENTS

| | | | |
|---|---|---|---|
| 10,248,867 B2* | 4/2019 | Henry | G11B 27/034 |
| 10,820,064 B2* | 10/2020 | Adams | H04N 21/8358 |
| 10,902,229 B2* | 1/2021 | Barnum | G06K 7/10722 |
| 10,904,594 B2* | 1/2021 | Frantz | H04N 21/44004 |
| 10,957,359 B2* | 3/2021 | Médioni | G11B 27/031 |
| 11,399,121 B2* | 7/2022 | Mcintosh | H04N 5/04 |
| 11,438,510 B2* | 9/2022 | Chun | H04N 5/144 |
| 2012/0148216 A1* | 6/2012 | Pavagada | H04N 5/772 386/278 |
| 2014/0376887 A1* | 12/2014 | Tijssen | G11B 27/34 386/282 |

\* cited by examiner

*Primary Examiner* — Helen Shibru
(74) *Attorney, Agent, or Firm* — ESPLIN & ASSOCIATES, PC

(57) ABSTRACT

Video frames of a video may be marked with visual patterns to identify individual video frames. The video may be changed by applying one or more effects to the video. The accuracy with which the changes were made to the video by the effect(s) may be determined using the visual patterns marked on the video frames.

20 Claims, 6 Drawing Sheets

System 10

SYSTEMS AND METHODS FOR CONFIRMING ACCURACY OF VIDEO EDITS

FIELD

This disclosure relates to confirming accuracy of video edits using video frames marked with visual patterns.

BACKGROUND

An edit to a video may change the timing of video frames in the video edit. Confirming that the timing of the video frames was accuracy changed in the video edit may be difficult and time consuming.

SUMMARY

This disclosure relates to confirming accuracy of video edits. Marked video information and/or other information may be obtained. The marked video information may define a marked video. The marked video may include video frames that are individually marked with a visual pattern to identify individual ones of the video frames. An effect to cause one or more changes to the marked video may be obtained. A modified video may be generated based on application of the effect to the marked video. The modified video may include one or more of the video frames of the marked video. Whether the generation of the modified video included the one or more changes to the marked video may be determined based on the visual pattern marked on at least one of the video frame(s) of the marked video included in the modified video and/or other information.

A system for confirming accuracy of video edits may include one or more electronic storage, one or more processors, and/or other components. The electronic storage may store marked video information, information relating to a marked video information relating to video frames, information relating to visual patterns, information relating to an effect, information relating to a modified video, information relating to accuracy of a video edit, and/or other information.

The processor(s) may be configured by machine-readable instructions. Executing the machine-readable instructions may cause the processor(s) to facilitate confirming accuracy of video edits. The machine-readable instructions may include one or more computer program components. The computer program components may include one or more of a marked video component, an effect component, a modified video component, an accuracy component, and/or other computer program components.

The marked video component may be configured to obtain marked video information and/or other information. The marked video information may define one or more marked videos. A marked video may include video frames that are individually marked with a visual pattern to identify individual ones of the video frames. In some implementations, a marked video may be generated based on a frame rate, a duration for the marked video, and/or other information.

In some implementations, the visual pattern may include one or more machine-readable optical codes. In some implementations, a machine-readable optical code may include a QR code.

In some implementations, the visual pattern of a given video frame in a marked video may identify a frame index and/or a timestamp of the given video frame in the marked video. In some implementations, the visual pattern of the given video frame in the marked video may further identify the marked video.

The effect component may be configured to obtain one or more effects to cause one or more changes to the marked video(s). In some implementations, an effect may include a selection effect to select one or more parts of the marked video(s) for inclusion in the modified video. In some implementations, an effect may include a playback speed effect to change perceived playback speed of the marked video(s) in the modified video.

The modified video component may be configured to generate a modified video based on application of the effect(s) to the marked video(s), the modified video include one or more of the video frames of the marked video(s).

The accuracy component may be configured to determine whether the generation of the modified video included the change(s) to the marked video(s) based on the visual pattern marked on at least one of the video frame(s) of the marked video(s) included in the modified video. In some implementations, determination of whether the generation of the modified video included the change(s) to the marked video(s) includes determination of whether the change(s) were accurately applied to the marked video(s).

In some implementations, one or more errors in the video frame(s) of the marked video(s) included in the modified video may be determined based on the visual pattern marked on the at least one of the video frame(s) of the marked video included in the modified video.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
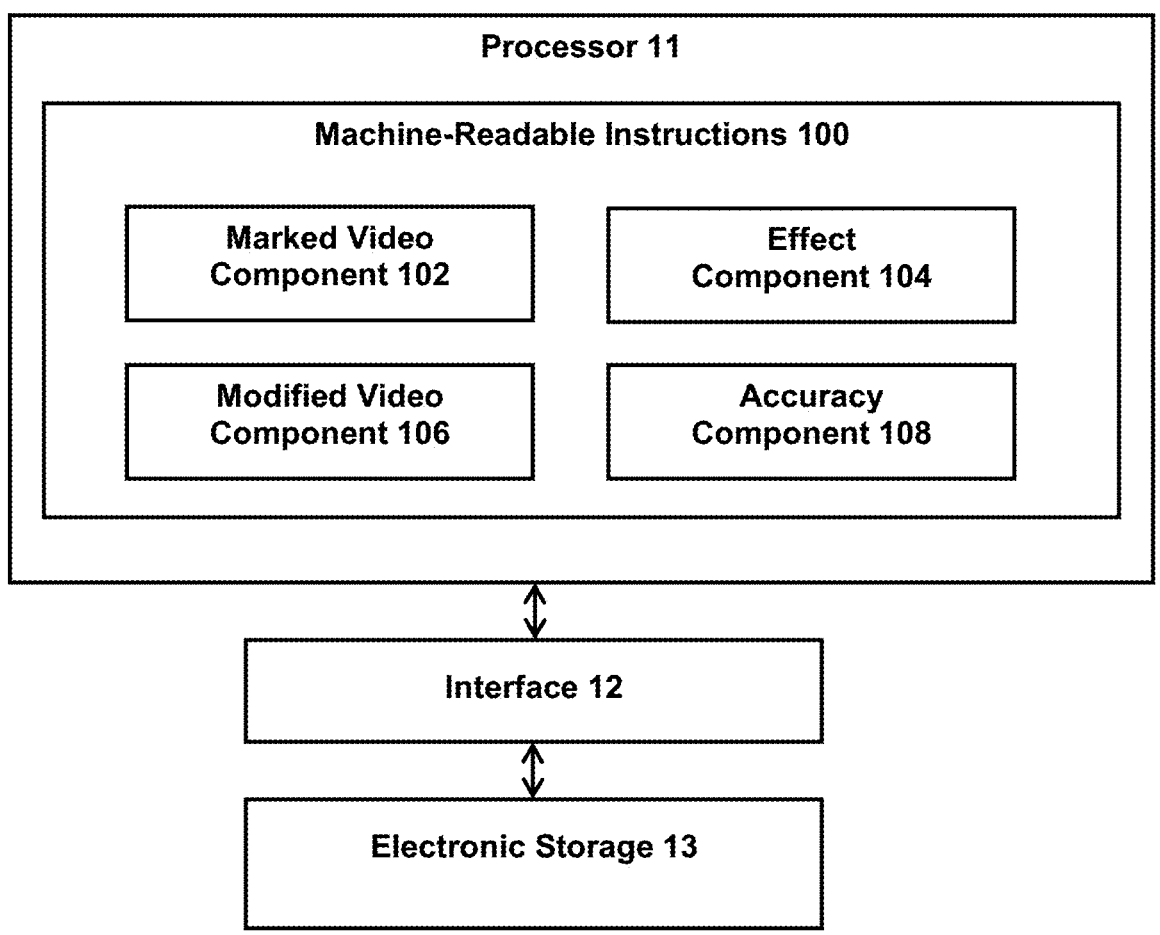
FIG. 1 illustrates a system for confirming accuracy of video edits.

FIG. 1 illustrates a system 10 for confirming accuracy of video edits. The system 10 may include one or more of a processor 11, an interface 12 (e.g., bus, wireless interface), an electronic storage 13, and/or other components. Marked video information and/or other information may be obtained by the processor 11. The marked video information may define a marked video. The marked video may include video frames that are individually marked with a visual pattern to identify individual ones of the video frames. An effect to cause one or more changes to the marked video may be obtained by the processor 11. A modified video may be generated by the processor 11 based on application of the effect to the marked video. The modified video may include one or more of the video frames of the marked video. Whether the generation of the modified video included the one or more changes to the marked video may be determined by the processor 11 based on the visual pattern marked on at least one of the video frame(s) of the marked video included in the modified video and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store marked video information, information relating to a marked video information relating to video frames, information relating to visual patterns, information relating to an effect, information relating to a modified video, information relating to accuracy of a video edit, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine readable instructions 100 to facilitate confirming accuracy of video edits. The machine-readable instructions 100 may include one or more computer program components. The machine-readable instructions 100 may include one or more of a marked video component 102, an effect component 104, a modified video component 106, an accuracy component 108, and/or other computer program components.

The marked video component 102 may be configured to obtain marked video information and/or other information. Obtaining marked video information may include one or more of accessing, acquiring, analyzing, determining, examining, generating, identifying, loading, locating, opening, receiving, retrieving, reviewing, selecting, storing, and/or otherwise obtaining the marked video information. The marked video component 102 may obtain marked video information from one or more locations. For example, the marked video component 102 may obtain marked video information from a storage location, such as the electronic storage 13, electronic storage of information and/or signals generated by one or more sensors, electronic storage of a device accessible via a network, and/or other locations. The marked video component 102 may obtain marked video information from one or more hardware components and/or one or more software components.

In some implementations, the marked video component 102 may obtain marked video information based on user interaction with a user interface/application (e.g., video editing application, video player application), and/or other information. For example, a user interface/application may provide option(s) for a user to generate a marked video and/or to modify a video. The marked video information defining a marked video may be obtained based on the user's selection of parameters to generate the marked video and/or the user's selection of the marked video through the user interface/video application. Other selections of marked video for retrieval of marked video information are contemplated.

The marked video information may define one or more marked videos. A marked video may include video content (e.g., visual content, audio content) having a progress length. A progress length may be defined in terms of time durations and/or frame numbers. For example, video content of a marked video may have a time duration of 60 seconds. Video content of a marked video may have 1800 video frames. Video content having 1800 video frames may have a play time duration of 60 seconds when viewed at 30 frames per second. Other progress lengths, time durations, and frame numbers are contemplated.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Audio content may refer to media content that may be consumed as one or more sounds. Audio content may include one or more sounds stored in one or more formats/containers, and/or other audio content. Audio content may include one or more sounds captured by one or more sound sensors (e.g., microphone). Audio content may include audio/sound captured during the capture of the visual content and/or audio/sound provided as an accompaniment for the visual content. Audio content may include one or more of voices, activities, songs, music, and/or other audio/sounds. Audio content may include sounds captured by a single sound sensor or an array of sound sensors. The audio content may be captured by one or more sound sensors of the image capture device (e.g., microphone(s) of and/or coupled to the image capture device) and/or may be captured by one or more sound sensors separate from the image capture device (e.g., microphone(s) separate from the image capture device).

A marked video may refer to a video in which the visual content are marked with one or more visual patterns. A visual pattern may convey information. A visual pattern may convey information relating to the video frame in which the visual pattern is marked. For example, a visual pattern may convey information that identifies/is used to identify different parts of the visual content. For example, a marked video may include video frames, and individual video frames may be marked with a visual pattern that identifies the individual video frame. A visual pattern of a video frame may identify the video frame by identifying/including information that identifies a frame index of the video frame in the marked video, a timestamp of the video frame in the marked video, and/or other information that identifies the video frame in the marked video. In some implementations, a visual pattern of a video frame may identify the video frame by identifying/including information that identifies the marked video in which the video frame is contained (source video of the video frame).

A visual pattern may convey information that identifies/is used to identify encoding of the video frame. For example, the visual pattern may convey information that identifies/is used to identify codec used to encode the video frame and/or group-of-pictures (GOP) structure of the video frame (e.g., whether the video frame is an I-frame, a P-frame, or a B-frame; the number and/or types of frames in the GOP).

A visual pattern may convey information that identifies/is used to identify content of the video frames. For example, the visual pattern may convey identifies/is used to identify characteristics of pixels in the video frame (e.g., colors in the video frame, color patches in the video frame, shapes in the video frame). Conveyance of other types of information relating to video frames by the visual pattern are contemplated.

In some implementations, a visual pattern may include one or more machine-readable optical codes. A machine-readable optical code may include a visual representation of information. The visual representation of information may be readable by a computing device. A machine-readable optical code may encode information visually by varying the size and/or the shape of patterns within the machine-readable optical code. Information may be encoded within a machine-readable optical code using one or more encoding modes. A machine-readable optical code may convey information for the video frame in which it is marked via the size, the shape, and/or other visual aspects of pattern(s) within the machine-readable optical code. In some implementations, a machine-readable optical code may include a one-dimensional machine-readable optical code (e.g., continuous or discrete barcodes), a two-dimensional machine-readable optical code (e.g., QR code), and/or a three-dimensional machine-readable optical code (e.g., holograms).

In some implementations, a visual pattern may include human readable text. Human readable text may refer to one or more words and/or one or more numbers that may be read by a human. In some implementation, a visual pattern may include both machine-readable optical code and human readable text. For example, a video frame may be marked with a visual pattern that includes both a QR code that conveys information about the video frame and human readable text conveying the same information.

In some implementations, a marked video may be generated as a blank video with the visual pattern. The video frames of the marked video may be empty (e.g., be of single color, such as white/grey/black) except for the visual pattern. In some implementations, a marked video may be generated to include visual and/or audio content. For example, a marked video may be generated to include color patches and/or shapes, which may be changed by application of one or more effects. In some implementations, a marked video may be generated to include content of another video. For example, a marked video may be generated by inserted visual pattern into the content of an existing video (e.g., overlay QR code on top of the original video from which the marked video is generated).

In some implementations, a marked video may be generated based on a frame rate for the marked video, a duration for the marked video, a dimension for the marked video, and/or other information. A frame rate may refer to a frequency/rate at which consecutive video frames are to be included in the marked video. A duration may refer to a temporal length of the content to be included marked video. A dimension may refer to a spatial size/extent (e.g., resolution) of the content to be included in the marked video. In some implementations, a marked video may be generated further based on a label for the marked video. A label may refer to a name or an identifier for the marked video. A label for a marked video may distinguish the marked video from other marked video(s).

In some implementations, a marked video may be generated based on information that is conveyed by the visual pattern. That is, the content of the marked video may be generated to correspond to/reflect the information that is conveyed by the visual pattern. Information that is conveyed by the visual pattern may be used to define the characteristics of the content to be included in the marked video.

In some implementations, one or more inputs for generating a marked video may be obtained from another video. An input for generating a marked video may define one or more characteristics of the content to be included in the marked video. Obtaining input(s) for generating a marked video from another video may include matching/setting characteristic(s) of the content to be included in the marked video to be the same as the other video. For example, the frame rate, the duration, and/or the dimension of the marked video may be set to be the same as another video (e.g., a video selected by a user to generate a marked video). As another example, the label of the marked video may be set to the same as the name of the other video.

Figure 3:
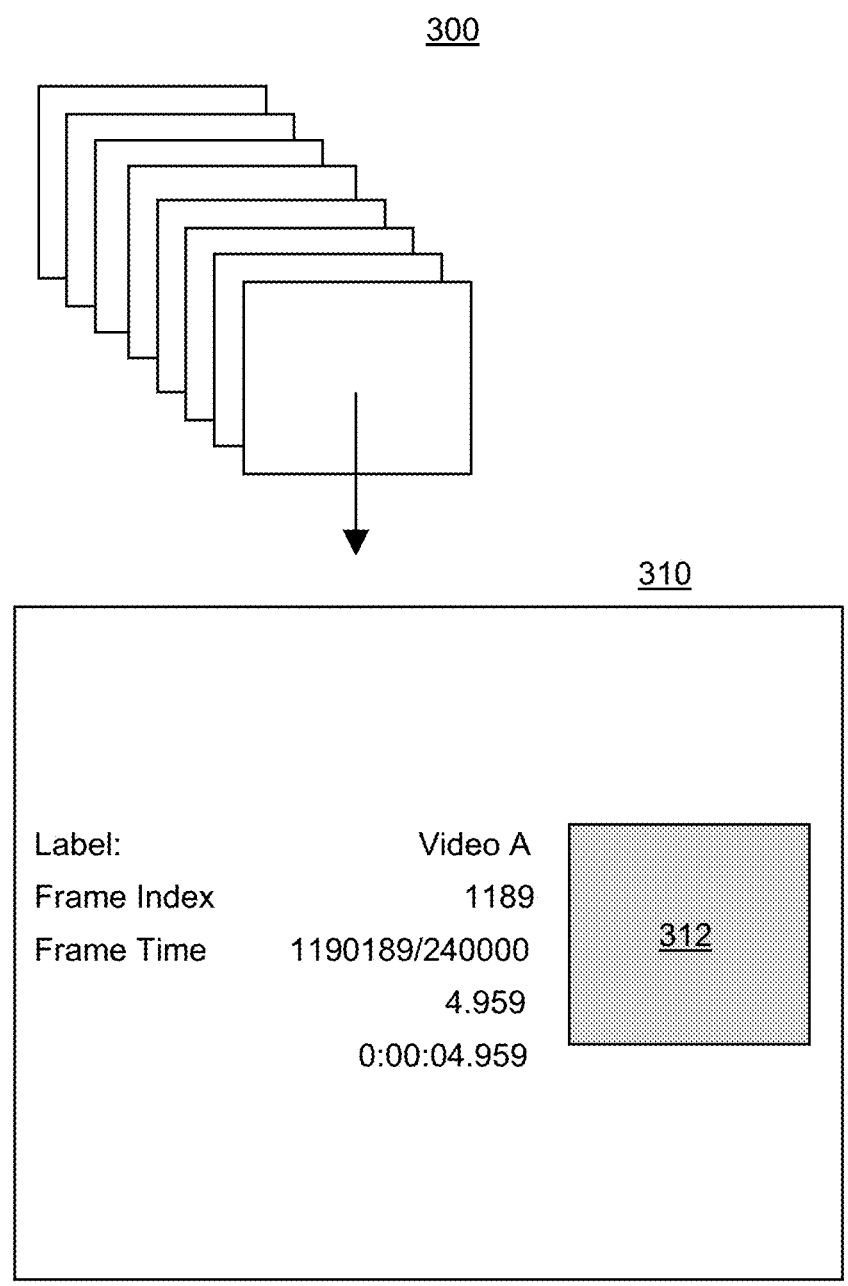
FIG. 3 illustrates an example marked video.

FIG. 3 illustrates an example marked video 300. The marked video 300 may include video frames. Each video frames of the marked video 300 may be marked with a visual pattern to identify each video frame. FIG. 3 shows an example video frame 310 of the marked video 300. The video frame 310 may include a visual pattern 312 (e.g., QR code) that identifies the video frame 310. The visual pattern 312 may identify the video frame 310 by identifying/including information that identifies the label of the marked video 300 (Video A), the frame index (1189), the frame time (1190189/240000; 4.959; 0:00:04.959), and/or other identifying information for the video frame 310. The frame time may be identified as a fraction (based on the framerate) to provide the exact frame time (rather than rounded frame time). The video frame 310 may include human readable text that conveys some or all of the information conveyed by the visual pattern 312. Other arrangement of information on the video frames are contemplated.

The marked video information may define a marked video by including information that defines one or more content, qualities, attributes, features, and/or other aspects of the marked video/video content. For example, the marked video information may define a marked video by including information that makes up the content of the marked video and/or information that is used to determine the content of the marked video. For instance, the marked video information may include information that makes up and/or is used to determine the arrangement of pixels, characteristics of pixels, values of pixels, and/or other aspects of pixels that define visual content of the marked video. The marked video information may include information that makes up and/or is used to determine audio content of the marked video. Other types of marked video information are contemplated.

The marked video information may be stored within a single file or multiple files. For example, marked video information defining a marked video may be stored within a video file, multiple video files, a combination of different files (e.g., a visual file and an audio file), and/or other files. The marked video information may be stored in one or more formats or containers. A format may refer to one or more ways in which the information defining a video is arranged/ laid out (e.g., file format). A container may refer to one or more ways in which information defining a video is arranged/laid out in association with other information (e.g., wrapper format).

The effect component 104 may be configured to obtain one or more effects to cause one or more changes to the marked video(s). Obtaining an effect may include one or more of accessing, acquiring, analyzing, determining, examining, generating, identifying, loading, locating, opening, receiving, retrieving, reviewing, selecting, storing, and/or otherwise obtaining the effect. The effect component 104 may obtain an effect from one or more locations.

In some implementations, the effect component 104 may obtain an effect based on user interaction with a user interface/application (e.g., video editing application, video player application), and/or other information. For example, a user interface/application may provide option(s) for a user to select an affect to be applied to a marked video. An effect may be obtained based on the user's selection of the effect for application to the marked video. Other selections of an effect are contemplated.

An effect may refer to a process/tool that changes (e.g., edits) and/or facilitates changes to the content of a video. An effect may change/facilitate changes to visual content, audio content, and/or other content of the video. An effect may change/facilitate change in what contents are included in the video. An effect may change/facilitate change in ordering, timing/temporal, and/or other characteristics of the content of the video. An effect may define one or more changes to be made to the content of the video. Application of an effect to a video may result in generation of a modified video. Application of an effect to a video may change the video to generate a modified video.

For example, an effect may include a selection effect to select one or more parts of the marked video(s) for inclusion in the modified video and/or for application of one or more other effects. A selection effect may refer to an effect that changes what part(s) of the marked video(s) are included in the modified video. A selection effect may refer to an effect that changes ordering of content included in the modified video. A selection effect may refer to an effect that identifies the part(s) of the marked video(s) to which one or more other effects are to be applied (which may require frame-level accuracy in frame selection).

Figure 4:
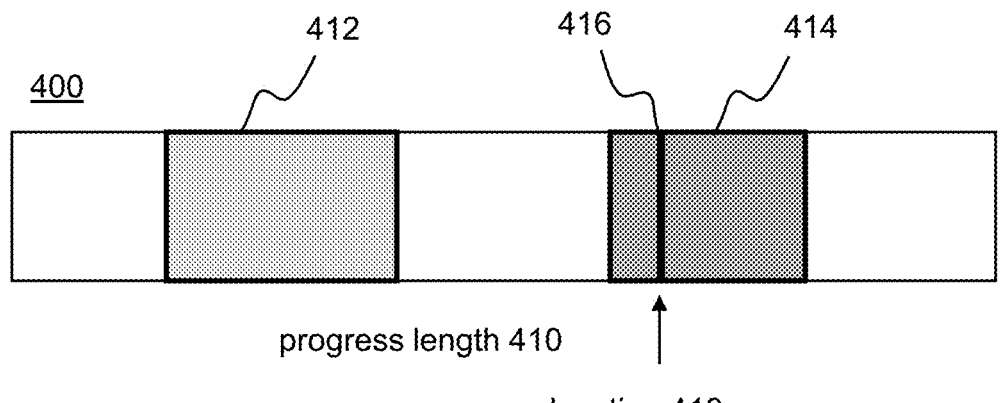
FIG. 4 illustrates an example selection of parts of a marked video for inclusion in a modified video.
Figure 4:
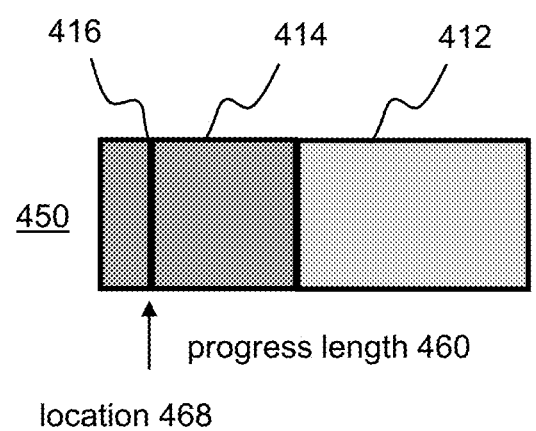

FIG. 4 illustrates an example selection of parts of a marked video 400 for inclusion in a modified video 450. The marked video 400 may have a progress length 410. A part 412 and a part 414 of the progress length 410 may be selected for inclusion in the modified video. The ordering of the parts 412, 414 may be switched in the modified video 450 so that the part 414 appears before the part 412 in the modified video 450. Inclusion of just the parts 412, 414 in the modified video 450 may result in a progress length 460 of the modified video 450 being shorter than the progress length 410 of the marked video 400. The selection and ordering of parts 412, 414 in the modified video may change placement (e.g., frame index, frame time) of video frames. For instance, in the marked video 400, a video frame 416 may be placed at a location 418 that is past the halfway point of the progress length 410. In the modified video 450, the video frame 416 may be placed at a location 468 that is near the beginning of the progress length 460.

An effect may include a playback speed effect to change perceived playback speed of the marked video(s) in the modified video. A playback speed effect may refer to an effect that changes the perceived playback speed of the marked video(s) in the modified video. A playback speed effect may increase or reduce the perceived playback speed of the marked video(s) in the modified video. A playback speed effect may change the perceived speed of one or more parts of the marked video(s) (e.g., speed up, speed down, reverse speed, freeze frame). A playback speed effect may change the perceived speed linearly and/or nonlinearly. A playback speed effect may change mapping between original playback times of the marked video(s) and the modified playback times of the modified video.

Figure 5:
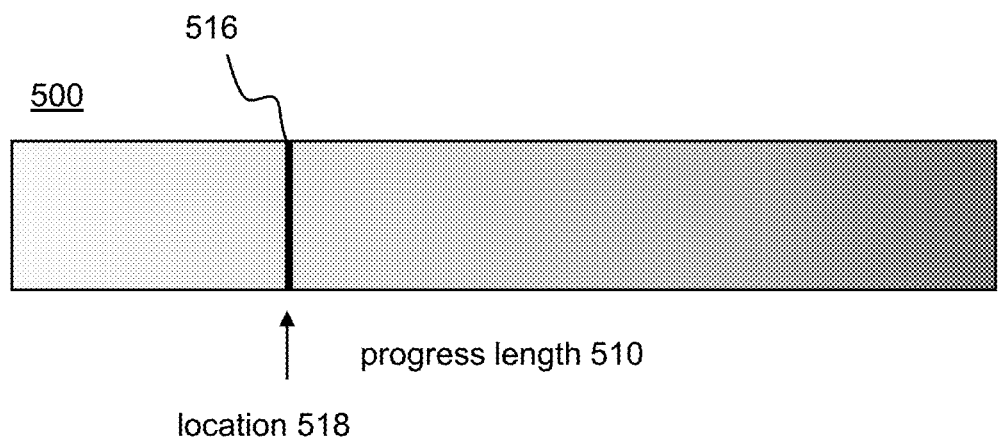
FIG. 5 illustrates an example changed in perceived playback speed of a marked video in a modified video.
Figure 5:
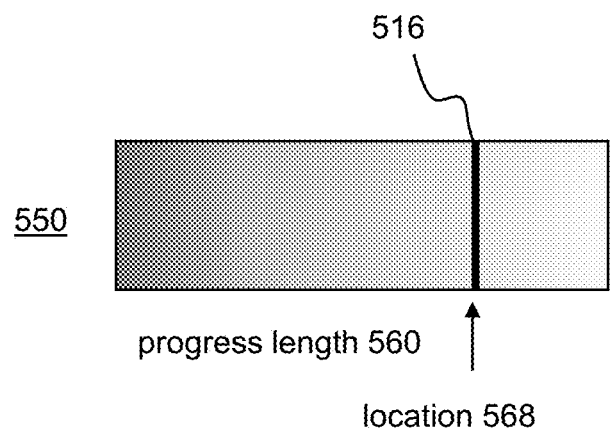

FIG. 5 illustrates an example changed in perceived playback speed of a marked video 500 in a modified video 550. The marked video 500 may have a progress length 510. The shading of the marked video 500 may indicate progression of video frames in the marked video 500, with earlier video frames (lighter shading) placed before later video frames (darker shading). The modified video 500 may be generated by changing the perceived playback speed of the marked video 500. For example, the perceived playback speed may be increased and reversed (e.g., from 1× to −2×). The increase in value of the perceived playback speed may result in a progress length 560 of the modified video 500 being shorter than (half as long) the progress length 510 of the marked video 500. The reversal of the perceived playback speed may result in the video frames of the marked video 500 being ordered in reverse in the modified video 550, such that earlier video frames of the marked video 500 become later video frames in the modified video 550 and later video frames of the marked video 500 become earlier video frames in the modified video 550. The change in perceived playback speed of the marked video 500 may change placement of video frames. For instance, in the marked video 500, a video frame 516 may be placed at a location 518 (¼ location) of the progress length 510. In the modified video 550, the video frame 516 may be placed at a location 568 (¾ location) of the progress length 560.

An effect may include a visual content modification effect to change visual content of the marked video(s) for inclusion in the modified video. A visual content modification effect may change visual content of one or more parts (e.g., temporal part(s), spatial part(s)) of the marked video(s). A visual content modification effect may change existing visual characteristic(s) of the visual content, add new visual characteristic(s) to the visual content, and/or remove existing visual characteristic(s) from the visual content.

An effect may include an audio content modification effect to change audio content of the marked video(s) for inclusion in the modified video. An audio content modification effect may change audio content of one or more parts of the marked video(s). An audio content modification effect may change existing audio characteristic(s) of the audio content, add new audio characteristic(s) to the audio content, and/or remove existing audio characteristic(s) from the audio content.

The modified video component 106 may be configured to generate a modified video. A modified video may include an edit of the video (a video edit). A modified video may be generated based on application of the effect(s) to the marked video(s). The modified video may include one or more of the video frames of the marked video(s). Differences between the content of the modified video and the content of the marked video(s) may be caused by the applied effect(s). The goal of applying the effect(s) to the marked video(s) may be to cause the change(s) defined by the effect(s) to the marked video(s) to generate the modified video. For example, referring to FIG. 4, the goal of applying an effect to the marked video 400 may be to generate the modified video 450 to include the parts 412, 414 of the marked video 400, with the part 414 coming before the part 412. Referring to FIG. 5, the goal of applying an effect to the marked video 500 may be to generate the modified video 500, with the video frames arranged in reversed and positioned so that the modified video 550 appears to have twice the playback speed of the marked video 500. Application of other effects to generate other modified videos is contemplated.

The accuracy component 108 may be configured to determine whether the generation of the modified video included the change(s) to the marked video(s). Determination of whether the generation of the modified video included the change(s) to the marked video(s) may include determination of whether the change(s) were accurately applied to the marked video(s). That is, the accuracy component 108 may be configured to determine whether the effect(s) were accurately applied to the marked video(s) to generate the modified video. The accuracy component 108 may be configured to determine whether the effect(s) were inaccurately applied to the marked video(s) to generate the modified video. The accuracy component 108 may be configured to determine whether the modified video includes changes intended by the applied effect(s). Determining whether the generation of the modified video included the change(s) to the marked video(s) may include determining whether the changes were applied to the right video frames and/or to the right marked video(s). Determining whether the generation of the modified video included the change(s) to the marked video(s) may include determining whether the extent of intended changes were correctly applied.

The accuracy component 108 may be configured to determine whether the generation of the modified video included the change(s) to the marked video(s) based on the visual pattern marked on at least one of the video frame(s) of the marked video(s) included in the modified video and/or other information. That is, the accuracy component 108 may be configured to determine whether the change(s) were accurately applied to the marked video(s) in generating the modified video based on the visual pattern(s) of the video frame(s) included in the modified video. The visual pattern(s) of the video frame(s) may enable identification of which video frame of the marked video(s) are included in the modified video. The visual pattern(s) of the video frame(s) may enable identification of how the video frame of the marked video(s) have been changed for inclusion in the modified video.

The visual pattern(s) of the video frame(s) may allow the accuracy component 108 to identify the source of the video frames in the modified video. The visual pattern(s) of the video frame(s) may allow the accuracy component 108 to determine the original frame index and/or the original frame time of the video frame(s) in the modified video frames, and determine whether the correct video frames are included in the modified video. For example, the visual pattern(s) of the video frame(s) may allow the accuracy component 108 to compare a video frame at a specific time in the marked video(s) to a video frame in the modified video. The visual pattern(s) of the video frame(s) may allow the accuracy component 108 to determine from which time in the marked video(s) a video frame in the modified video originated. For example, an effect may be intended to cause change in playtimes of the video frames so that a video frame that is presented at a particular play time (moment X) in a marked video is presented at a different playtime (moment Y) in the modified video. The visual pattern(s) of the video frame(s) may allow the accuracy component 108 to determine whether the video frame at moment Y in the modified video is the video frame at moment X in the marked video. The visual pattern(s) of the video frame(s) may allow the accuracy component 108 to determine whether a video frame in the modified video at a particular moment came from the right marked video.

A visual pattern of a video frame in the modified video may identify the source video frame in the marked video(s). For example, the visual pattern of the video frame in the modified video may identify (1) from which marked video the video frame was extracted for inclusion in the modified video, and/or (2) the original location (e.g., frame index, frame time) of the video frame in the marked video. Changes to frame location (e.g., frame index, frame time) of the video frame in the marked video may be compared with the changes to the frame location that was to be made in generation of the modified video to determine whether or not/the extent to which the changes were applied. Changes to the visual content of the video frame and/or the corresponding audio content may be compared with the changes that were to be applied (by the effect(s)) in generation of the modified video to determine whether or not/the extent to which the changes were applied. The label of the marked video in the video frames may be used to determine whether or not the changes were correctly applied to the right marked video.

For example, referring to FIG. 4, the visual pattern of the video frame in the modified video 450 at the location 468 may be checked to see whether the location 468 is occupied by the video frame 416 (from the location 418 in the marked video 400). Referring to FIG. 5, the visual pattern of the video frame in the modified video 550 at the location 568 may be checked to see whether the location 568 is occupied by the video frame 516 (from the location 518 in the marked video 500). The visual patterns of the video frames in the modified video may identify the source video frames (identify from which frame position of the marked video(s) the video frame originated). The accuracy component 108 may determine whether the changes were applied to the right video frames by using the identification of the source video frames in the modified video.

For instance, the accuracy component 108 may determine whether a visual content modification effect was applied to the correct video frame/applied correctly to the video frame by checking the source video frame to which the visual content was changed in the modified video. The accuracy component 108 may determine whether a selection effect selected (e.g., extracted, identified) the correct video frame for inclusion in the modified video by comparing the source video frame at a location in the modified video to the source video frame expected at the location in the modified video. The accuracy component 108 may determine whether a playback speed effect was correctly applied to the video frames by checking order and/or spacing of the source video frames in the modified video to the expected order and/or spacing of the source video frames in the modified video. For instance, referring to FIG. 6, the accuracy component 108 may use the visual patterns of video frames in the modified video 550 to determine whether the video frames are ordered in reversed and correctly spaced apart (including one video frame for every frame of the marked video 500) to create the 2× perceived playback effect.

In some implementations, one or more errors in the video frame(s) of the marked video(s) included in the modified video may be determined based on the visual pattern marked on the at least one of the video frame(s) of the marked video included in the modified video. That is, the visual pattern(s) of the video frame(s) included in the modified video may be used to determine whether there are error(s) in the modified video. For example, the visual pattern(s) of the video frame(s) included in the modified video may be used to identify error(s) (e.g., duplication, drops) in the sequence of the video frame(s) included in the modified video.

Figure 6:
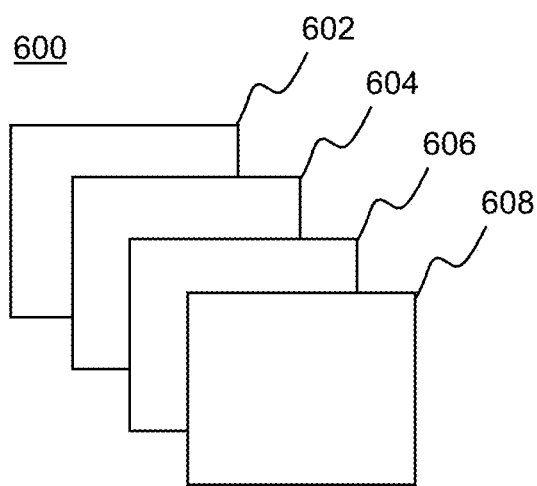
FIG. 6 illustrates example video frames in a modified video.

FIG. 6 illustrates example video frames in a modified video 600. The modified video 600 may include video frames 602, 604, 606, 608. The visual patterns in the video frames 602, 604, 606, 608 may identify the original locations (e.g., frame index, frame time) of the video frames in the marked video(s). The accuracy component 108 may use the visual patterns (identification of original locations conveyed by the visual patterns) to determine (e.g., detect, identify) error(s) in the sequence of video frames.

For example, duplication of same visual pattern across two or more of the video frames 602, 604, 606, 608 may indicate that the same video frame in the marked video(s) were duplicated in the modified video 600. If the duplication of the video frames was not intended, the presence of duplicate visual pattern may indicate an error in generation of the modified video 600.

As another example, unexpected dropping of video frames may be detected/identified by checking the spacing of video frames' original locations. For instance, to increase the perceived playback speed in the modified video 600, every other video frames in the marked video(s) may be dropped for inclusion in the modified video 600. If the visual patterns in the video frames 602, 604, 606, 608 do not indicate dropping of every other video frame (e.g., adjacent pairs of frame indexes/frame times in the modified video 600 jumping over in-between frame index/frame time), then the intended increase in perceived playback speed may have been incorrectly applied.

As another example, the visual patterns may be used to determine whether the modified video includes a correct GOP structure. For example, the visual pattern may indicate the type of video frame (e.g., I-frame, P-frame, B-frame), and the sequence of types of video frames may be used to determine whether the modified video includes the correct sequence of different types of video frames (e.g., whether a 30-frame group includes a single I-frame followed by twenty-nine P-frames). Determining accuracy of other types of effects are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although processor 11 and electronic storage 13 are shown to be connected to interface 12 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which the processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While the computer program components are described herein as being implemented via processor 11 through machine readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components 102 and/or 104 may be eliminated, and some or all of its functionality may be provided by other computer program components. As another example, the processor 11 may be configured to execute one or more additional computer program components that may perform some or all of the functionality attributed to one or more of computer program components 102 and/or 104 described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
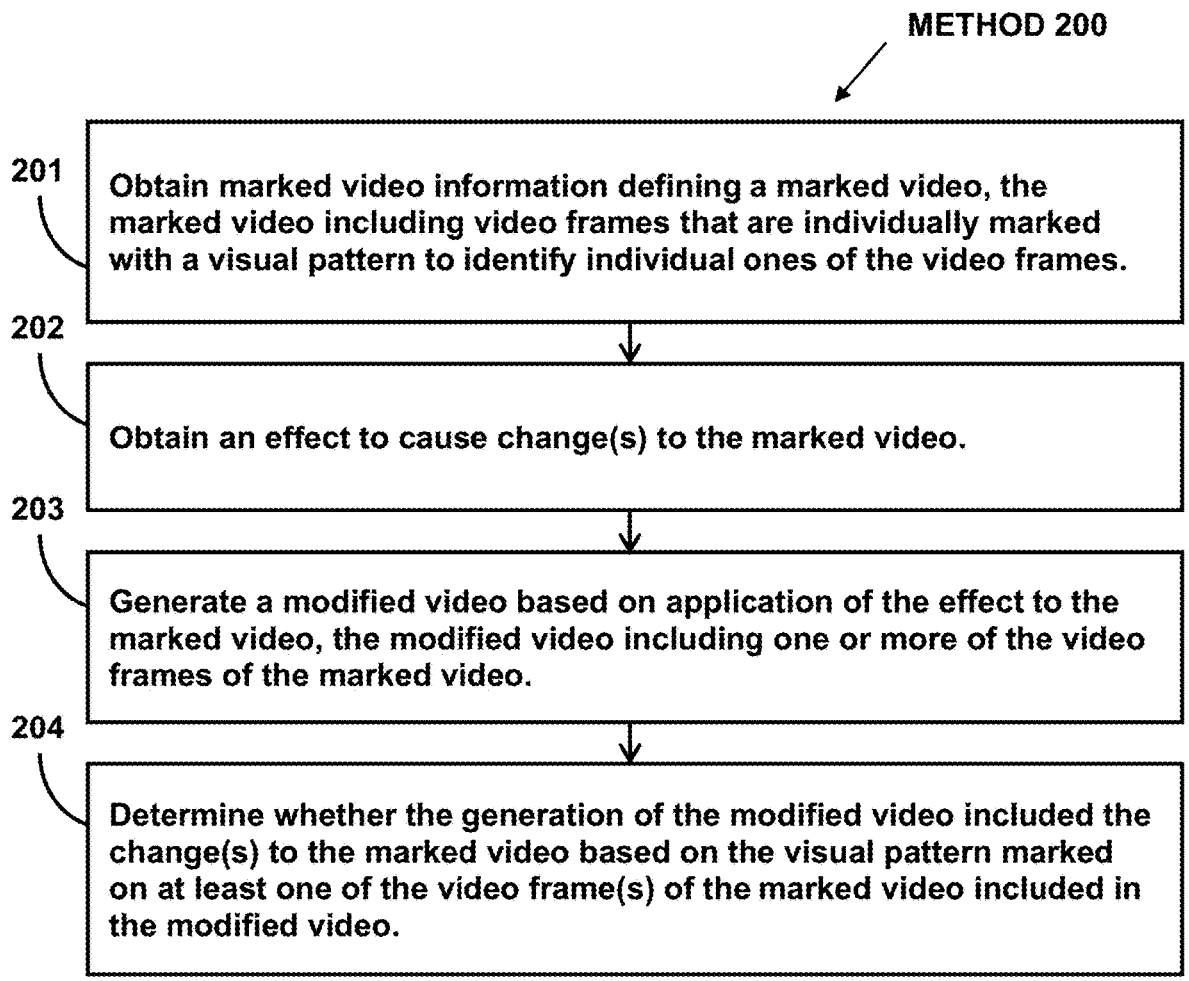
FIG. 2 illustrates a method for confirming accuracy of video edits.

FIG. 2 illustrates method 200 for sharing capture settings for visual content capture. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, marked video information and/or other information may be obtained. The marked video information may define a marked video. The marked video may include video frames that are individually marked with a visual pattern to identify individual ones of the video frames. In some implementation, operation 201 may be performed by a processor component the same as or similar to the marked video component 102 (Shown in FIG. 1 and described herein).

At operation 202, an effect to cause one or more changes to the marked video may be obtained. In some implementation, operation 202 may be performed by a processor component the same as or similar to the effect component 104 (Shown in FIG. 1 and described herein).

At operation 203, a modified video may be generated based on application of the effect to the marked video. The modified video may include one or more of the video frames of the marked video. In some implementation, operation 203 may be performed by a processor component the same as or similar to the modified video component 106 (Shown in FIG. 1 and described herein).

At operation 204, whether the generation of the modified video included the one or more changes to the marked video may be determined based on the visual pattern marked on at least one of the video frame(s) of the marked video included in the modified video and/or other information. In some implementation, operation 204 may be performed by a processor component the same as or similar to the accuracy component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for confirming accuracy of video edits, the system comprising:
    one or more physical processors configured by machine-readable instructions to:
        obtain marked video information defining a marked video, the marked video including video frames that are individually marked with a visual pattern to identify location of individual ones of the video frames in the marked video, a given video frame of the marked video including a given visual pattern within the given video frame that identifies a first location of the given video frame in the marked video, the first location of the given video frame in the marked video being an original location of the given video frame in the marked video;
        obtain an effect to cause one or more changes to the marked video to generate a modified video, the one or more changes to the marked video including a change in location of the given video frame from the first location in the marked video to a second location in the modified video, the second location being different from the first location, the second location being a changed location of the given video frame in the modified video;
        generate the modified video based on application of the effect to the marked video, the modified video including one or more of the video frames of the marked video, wherein the application of the effect to the marked video to generate the modified video is intended to change the location of the given video frame from the first location in the marked video to the second location in the modified video; and
        determine whether the one or more changes of the effect were accurately applied to the marked video to generate the modified video based on the visual pattern marked within at least one of the one or more of the video frames of the marked video included in the modified video, wherein whether the intended change in the location of the given video frame from the first location in the marked video to the second location in the modified video is determined based on the visual pattern marked within a video frame at the second location in the modified video.

2. The system of claim 1, wherein the intended change in the location of the given video frame from the first location in the marked video to the second location in the modified video is determined to have been accurately applied based on the visual pattern marked within the video frame at the second location in the modified video identifying the first location in the marked video.

3. The system of claim 1, wherein the effect includes a selection effect to select one or more parts of the marked video for inclusion in the modified video.

4. The system of claim 1, wherein the effect includes a playback speed effect to change perceived playback speed of the marked video in the modified video.

5. The system of claim 1, wherein an error in the one or more of the video frames of the marked video included in the modified video is determined based on the visual pattern marked within the at least one of the one or more of the video frames of the marked video included in the modified video.

6. The system of claim 1, wherein the marked video is generated based on a frame rate and a duration for the marked video.

7. The system of claim 1, wherein the visual pattern of the given video frame identifies a frame index and/or a timestamp of the given video frame in the marked video, the frame index being an original frame index of the given video frame in the marked video, the timestamp being an original timestamp of the given video frame in the marked video.

8. The system of claim 7, wherein the visual pattern of the given video frame further identifies the marked video.

9. The system of claim 1, wherein the visual pattern includes a machine-readable optical code.

10. A method for confirming accuracy of video edits, the method performed by a computing system including one or more processors, the method comprising:
obtaining, by the computing system, marked video information defining a marked video, the marked video including video frames that are individually marked with a visual pattern to identify location of individual ones of the video frames in the marked video, a given video frame of the marked video including a given visual pattern within the given video frame that identifies a first location of the given video frame in the marked video, the first location of the given video frame in the marked video being an original location of the given video frame in the marked video;
obtaining, by the computing system, an effect to cause one or more changes to the marked video to generate a modified video, the one or more changes to the marked video including a change in location of the given video frame from the first location in the marked video to a second location in the modified video, the second location being different from the first location, the second location being a changed location of the given video frame in the modified video;
generating, by the computing system, the modified video based on application of the effect to the marked video, the modified video including one or more of the video frames of the marked video, wherein the application of the effect to the marked video to generate the modified video is intended to change the location of the given video frame from the first location in the marked video to the second location in the modified video; and
determining, by the computing system, whether the one or more changes of the effect were accurately applied to the marked video to generate the modified video based on the visual pattern marked within at least one of the one or more of the video frames of the marked video included in the modified video, wherein whether the intended change in the location of the given video frame from the first location in the marked video to the second location in the modified video is determined based on the visual pattern marked within a video frame at the second location in the modified video.

11. The method of claim 10, wherein the intended change in the location of the given video frame from the first location in the marked video to the second location in the modified video is determined to have been accurately applied based on the visual pattern marked within the video frame at the second location in the modified video identifying the first location in the marked video.

12. The method of claim 10, wherein the effect includes a selection effect to select one or more parts of the marked video for inclusion in the modified video.

13. The method of claim 10, wherein the effect includes a playback speed effect to change perceived playback speed of the marked video in the modified video.

14. The method of claim 10, wherein an error in the one or more of the video frames of the marked video included in the modified video is determined based on the visual pattern marked within the at least one of the one or more of the video frames of the marked video included in the modified video.

15. The method of claim 10, wherein the marked video is generated based on a frame rate and a duration for the marked video.

16. The method of claim 10, wherein the visual pattern of the given video frame identifies a frame index and/or a timestamp of the given video frame in the marked video, the frame index being an original frame index of the given video frame in the marked video, the timestamp being an original timestamp of the given video frame in the marked video.

17. The method of claim 16, wherein the visual pattern of the given video frame further identifies the marked video.

18. The method of claim 10, wherein the visual pattern includes a machine-readable optical code.

19. A system for confirming accuracy of video edits, the system comprising:
one or more physical processors configured by machine-readable instructions to:
obtain marked video information defining a marked video, the marked video including video frames that are individually marked with a visual pattern to identify location of individual ones of the video frames in the marked video, a given video frame of the marked video including a given visual pattern within the given video frame that identifies a first location of the given video frame in the marked video, the first location of the given video frame in the marked video being an original location of the given video frame in the marked video;
obtain an effect to cause one or more changes to the marked video to generate a modified video, the one or more changes to the marked video including a change in location of the given video frame from the first location in the marked video to a second location in the modified video, the second location being different from the first location, the second location being a changed location of the given video frame in the modified video;
generate the modified video based on application of the effect to the marked video, the modified video including one or more of the video frames of the marked video, wherein the application of the effect to the marked video to generate the modified video is intended to change the location of the given video frame from the first location in the marked video to the second location in the modified video; and
determine whether the one or more changes of the effect were accurately applied to the marked video to generate the modified video based on the visual pattern marked within at least one of the one or more of the video frames of the marked video included in the modified video, wherein an error in the one or more of the video frames of the marked video included in the modified video is determined based on the visual pattern marked within the at least one of the one or more of the video frames of the marked video included in the modified video, wherein whether the intended change in the location of the given video frame from the first location in the marked video to the second location in the modified video is determined based on the visual pattern marked within a video frame at the second location in the modified video.

20. The system of claim 19, wherein:

the visual pattern includes a machine-readable optical code; and the visual pattern of the given video frame identifies a frame index and/or a timestamp of the given video frame in the marked video, the frame index being an original frame index of the given video frame in the marked video, the timestamp being an original timestamp of the given video frame in the marked video.

\* \* \* \* \*